(No Model.) 4 Sheets—Sheet 1.
E. WALSH, Jr.
MANUFACTURE OF ROLLED SHEET GLASS.

No. 367,565. Patented Aug. 2, 1887.

WITNESSES
S. L. Schrader.
Edwin Sauter.

INVENTOR
Edward Walsh Jr.
Paul Bakewell,
his attorney (No Model.)  4 Sheets—Sheet 2.
E. WALSH, Jr.
MANUFACTURE OF ROLLED SHEET GLASS.
No. 367,565.  Patented Aug. 2, 1887.
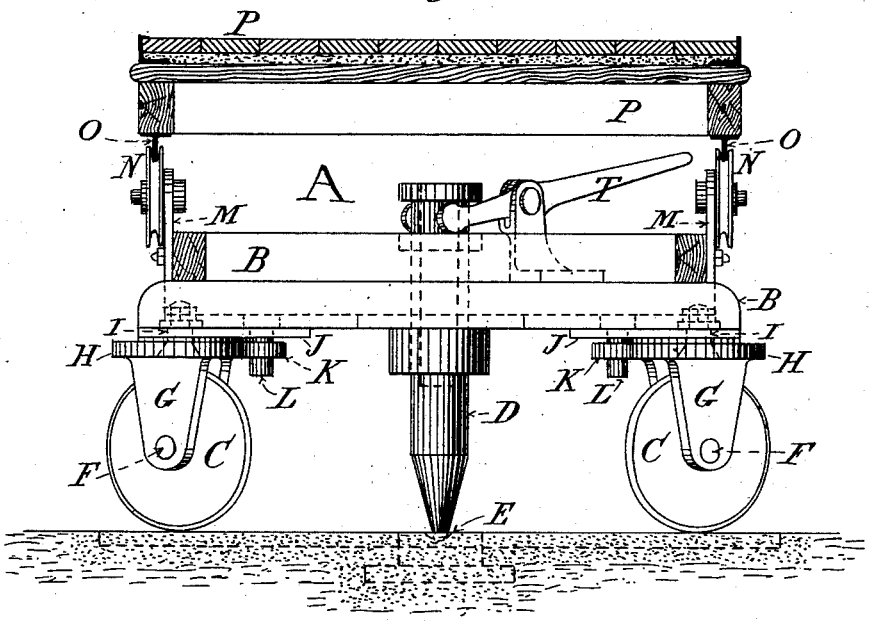
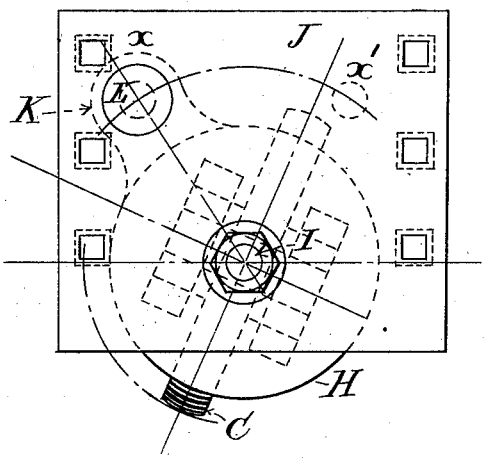
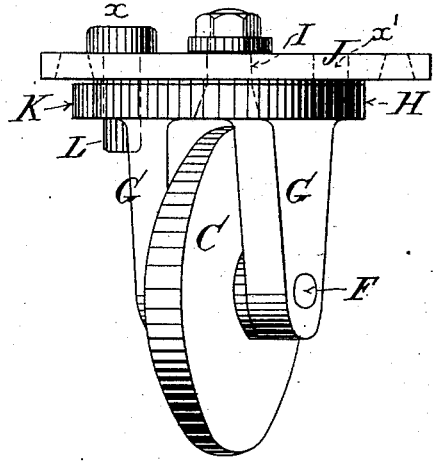
WITNESSES  INVENTOR (No Model.) 4 Sheets—Sheet 3.
E. WALSH, Jr.
MANUFACTURE OF ROLLED SHEET GLASS.

No. 367,565. Patented Aug. 2, 1887.

WITNESSES
S. L. Schrader.
Edwin Sauter

INVENTOR
Edward Walsh Jr.
Paul Bakewell,
his attorney (No Model.) 4 Sheets—Sheet 4.
E. WALSH, Jr.
MANUFACTURE OF ROLLED SHEET GLASS.
No. 367,565. Patented Aug. 2, 1887.
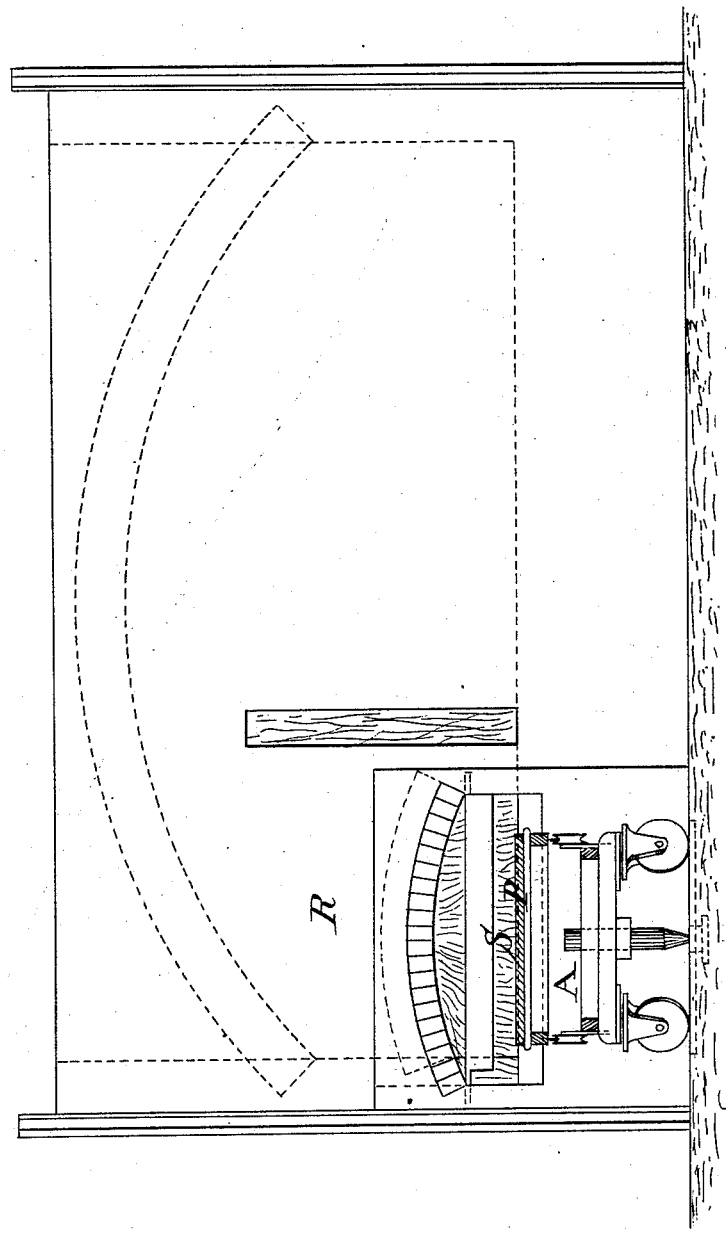
WITNESSES
S. L. Schrader,
Edwin Sauter
INVENTOR
Edward Walsh Jr.
Paul Bakewell
his attorney

UNITED STATES PATENT OFFICE.

EDWARD WALSH, JR., OF ST. LOUIS, MISSOURI.

MANUFACTURE OF ROLLED SHEET-GLASS.

SPECIFICATION forming part of Letters Patent No. 367,565, dated August 2, 1887.

Application filed February 19, 1887. Serial No. 228,174. (No model.)

*To all whom it may concern:*

Be it known that I, EDWARD WALSH, Jr., a citizen of the United States, residing at the city of St. Louis, State of Missouri, have invented a certain new and useful Improvement in the Manufacture of Rolled Sheet-Glass, of which the following specification is a full, clear, and exact description.

My invention relates to improvements in the construction and arrangement of apparatus for manufacturing rolled sheet-glass, and has for its object to facilitate the transfer of the rolled sheet-glass from the rolling table (or tables) to the annealing-kilns, so as to economize time and labor and improve the quality of the glass and reduce the cost of its production.

Hitherto the rolling-tables and annealing-kilns have been irregularly arranged relatively with each other, and the sheets of glass have been transferred from one to the other on a two-wheeled hand truck or trolley, regardless of the directions and distances to be traversed between the rolling-tables and the respective kilns, the consequence being that the time occupied in wheeling the truck to the tables, and changing its position again for carrying the sheets of glass to the kiln, is a cause of delay and trouble.

Now, my invention consists in arranging the delivery ends of the rolling table (or tables) and the mouths of the annealing-kilns at suitable distances apart along the circumference of a circle, at the center of which is pivoted a specially-constructed truck or trolley surmounted by a movable receiving-table for receiving and carrying the glass, the whole operating so that by a combined movement of the trolley and receiving-table a sheet of rolled glass is readily and speedily transferred in a direct manner from either of the rolling-tables to either of the annealing-kilns in the least practical time and with a minimum amount of labor.

Figure 1:
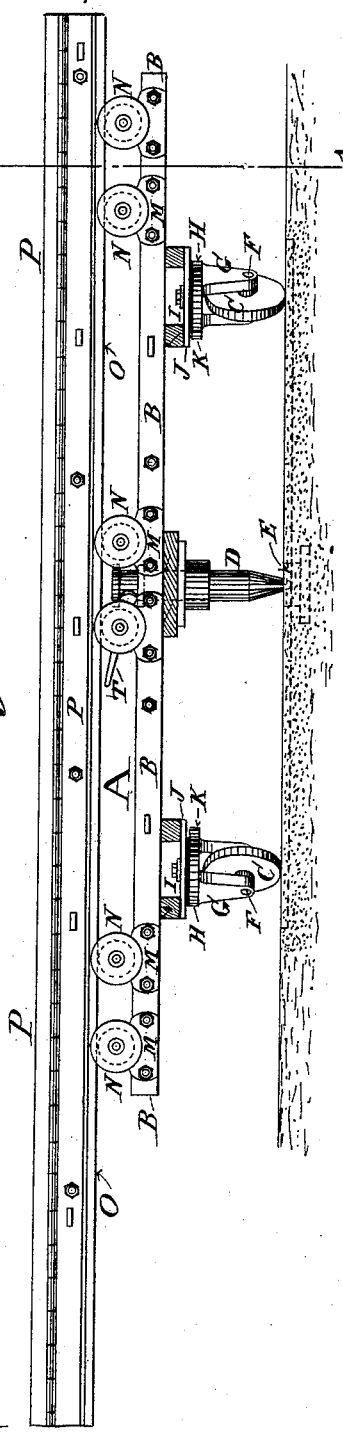
Figure 2:
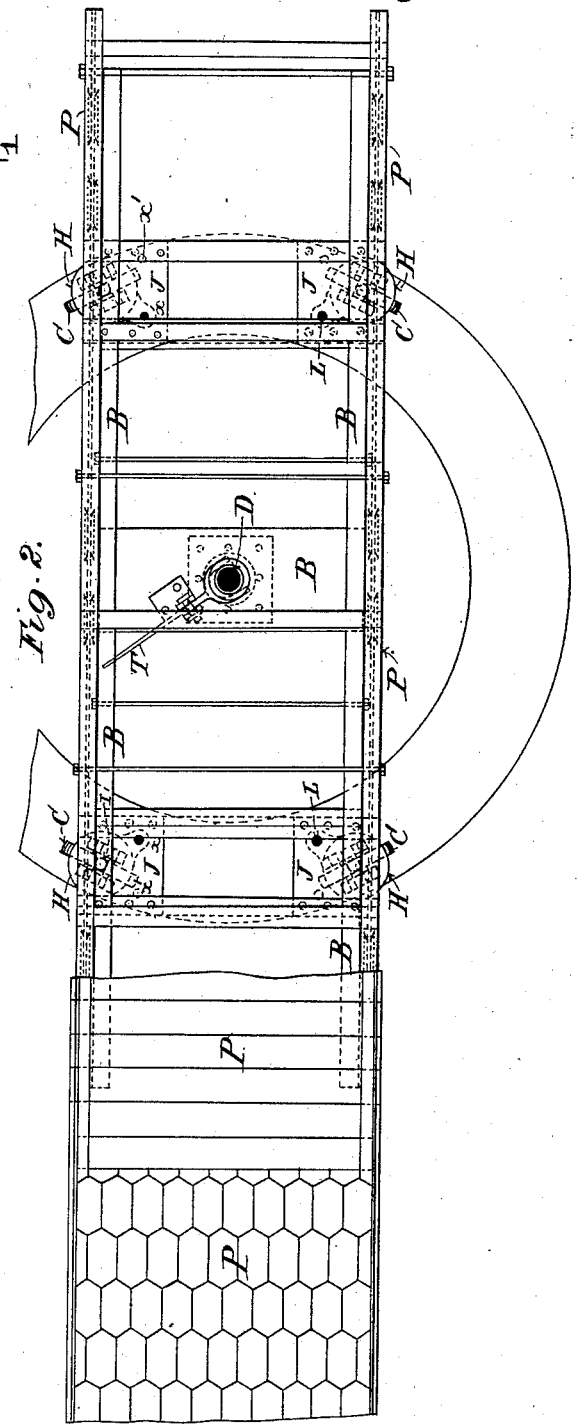
Figure 6:
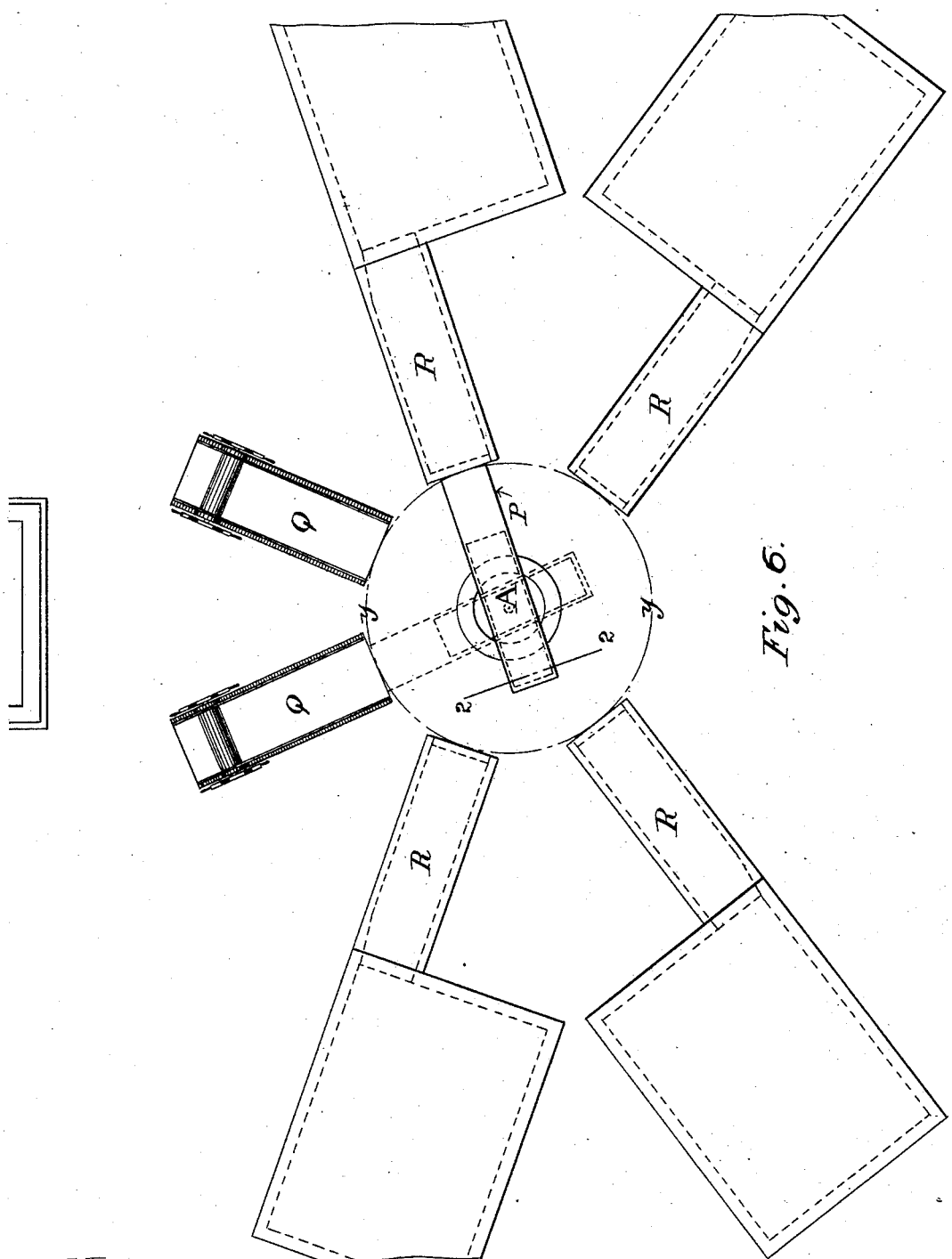

On the accompanying drawings, Figure 1 is a side elevation representing my improved truck or trolley for transferring the sheet-glass from the rolling-tables to the annealing-kilns, according to my invention; Fig. 2, a plan thereof broken away; Fig. 3, a transverse section to an enlarged scale on line 1 1, in Fig. 1; Figs. 4 and 5, detached plan and side elevation, respectively, of parts of Fig. 1; Fig. 6, a plan showing the truck or trolley, rolling-tables, and annealing-kilns arranged according to my invention; and Fig. 7, a detached sectional elevation to an enlarged scale on line 2 2 in Fig. 6, showing the truck or trolley in position at the mouth of one of the annealing-kilns, like letters of reference denoting like parts in all the figures.

The improved transfer truck or trolley A consists of a horizontal rectangular framing, B, supported and running on four wheels or rollers C, which are equidistant from a point of the framing B, where a pin, D, may be mounted in and passed down through the framing B, so as to be centered in a block or step, E, in the ground, and thereby constitute a central pivot, around which the truck or trolley A may be rotated. Each wheel or roller C is mounted on its spindle F in and between jaws or brackets G projecting from a plate H, which is pivoted, in line with the vertical center passing through the roller C midway between its faces, by a pin-bolt, I, to a bearing-plate, J, fixed to the under side of the framing B. The plate H is prevented from turning on its pivot I by a short arm, K, which extends horizontally from the periphery of the plate H, and is secured adjustably to the bearing-plate J by a pin, L, at either of two points, $x$ or $x'$—that is to say, when the arm K is secured to the bearing-plate J at the point $x$ the wheel or roller C will be radial to the center pivot, D, or the framing B, and when secured at the point $x'$ the wheel or roller C will be parallel with the sides of the framing B.

On each side of the framing B are fixed brackets M, to which are pivoted grooved or flanged rollers N, the grooves of the entire series of rollers N being horizontally in line, or on the same level, with each other for respectively supporting and guiding the two longitudinal bars O, carrying an overhead transfer-table, P, the upper surface of which is laid with elongated hexagon or other shaped tiles, bricks, or other suitable non-conducting material, and brought to a smooth and level horizontal surface for receiving the rolled sheets of glass, as hereinafter more particularly referred to.

Referring to Fig. 6, I arrange the glass-rolling tables Q and annealing-kilns R radially to the center of a circle, $y$, of suitable diameter, so that the delivery ends of the rolling-tables Q and mouths of the kilns R are at convenient distances apart along the circumference of the circle $y$, to which they are tangential.

When it is required to transfer a sheet of rolled glass from one of the rolling-tables Q to either of the annealing-kilns R, the transfer truck or trolley A is placed in position with its pivot pin D centered in the block or step E at the center of the circle $y$, and the bracket-plates H of its wheels or rollers C fixed so that the latter are radial with the center-pin D. The truck or trolley A is then partially rotated on its wheels or rollers C until its upper table, P, is in line with the end of the rolling-table on which the glass has been rolled, when the upper table, P, is pushed along its supporting-rollers N until up to and in contact with the delivery end of the rolling-table Q. (See dotted lines in Fig. 6.) The sheet of rolled glass is then drawn from the rolling-table Q onto the table P, and the latter moved backward somewhat on its rollers N, when the truck or trolley A is again partially rotated on its wheels or rollers C until the table P is in line with the mouth of the kiln R, when the table P, carrying the sheet of glass, is pushed up to the mouth of the kiln R, (see Figs. 6 and 7,) and the glass sheet transferred from the table P into the annealing-kiln R, through the opening or mouth S of the latter.

It will thus be seen that by a combined partial rotation and reciprocation of the framing B and upper table, P, respectively, of the truck or trolley A, the entire series of annealing-kilns R are equally accessible from the rolling-tables Q and the distances to be traversed by the truck or trolley A reduced to a minimum. A great saving of time is thus effected in manipulating the rolled sheets of glass, which is an important advantage in the process of annealing when any abnormal cooling, such as that caused by the present delay in transferring the glass to the kilns, tends to make the glass brittle.

When the truck or trolley A is not required for use, the bracket-plates H of its rollers C are shifted and fixed at point $x'$ of the bearing-plates J, and the central pivot-pin, D, raised clear of its block or step E by a clutch-lever, T, or other device, so that the truck or trolley A can then be wheeled away from the kilns and tables in any desired direction.

I claim as my invention—

1. In the manufacture of rolled sheet-glass, the combination, with the rolling table (or tables) and annealing-kilns arranged radially to the center of a circle, of a truck or trolley running on adjustable wheels or rollers, and carrying an upper movable table constructed and arranged to operate from the center of such circle of kilns, substantially as shown, and for the purpose described.

2. In the manufacture of rolled sheet-glass, the combination, with the rolling table (or tables) and annealing-kilns arranged radially to the center of a circle, of a truck or trolley, A, composed of framing B, running on adjustable wheels or rollers C, and having central pivot-pin, D, and grooved or flanged rollers N, carrying upper movable table, P, constructed and arranged to operate from the center of such circle or kilns, substantially as shown, and for the purpose described.

3. In the manufacture of rolled sheet-glass, the combination, with the truck or trolley A, having framing B and bearing-plates J, of wheels or rollers C, mounted on spindles F in brackets G, plates H, having pivot-pin bolt I, arms K, pins L, central pivot, D, and lever T, substantially as shown, and for the purpose described.

4. In the manufacture of rolled sheet-glass, the combination, with the truck or trolley A, having framing B, and grooved or flanged rollers N, carrying upper movable table, P, of bearing-plates J, wheels or rollers C, spindles F, brackets G, plates H, pivot-pin bolts I, arms K, pins L, and central pivot-pin, D, substantially as shown, and for the purpose described.

5. In the manufacture of rolled sheet-glass, the combination, with the rolling table (or tables) and annealing-kilns arranged radially to the center of a circle of a truck or trolley, A, composed of framing B, having bearing-plates J, wheels or rollers C, spindles F, brackets G, plates H, pivot-pin bolts I, arms K, pins L, central pivot-pin, D, lever T, and grooved or flanged rollers N, carrying upper movable table, P, constructed and arranged to operate from the center of such circle of kilns, substantially as shown, and for the purpose described.

In testimony whereof I affix my signature, in presence of two witnesses, this 16th day of February, 1887.

EDWARD WALSH, Jr.

Witnesses:
S. L. SCHRADER,
EDWIN SAUTER.